(12) United States Patent
Howard et al.

(10) Patent No.: US 9,255,008 B2
(45) Date of Patent: Feb. 9, 2016

(54) GRAPHENE SOLUTIONS

(75) Inventors: Christopher Howard, London (GB); Neal Skipper, London (GB); Milo Shaffer, London (GB); Emily Milner, Norfolk (GB)

(73) Assignee: UCL Business PLC, London (GB)

( * ) Notice: Subject to any disclaimer, the term of this patent is extended or adjusted under 35 U.S.C. 154(b) by 0 days.

(21) Appl. No.: 14/128,808

(22) PCT Filed: Jun. 26, 2012

(86) PCT No.: PCT/GB2012/000550
§ 371 (c)(1), (2), (4) Date: Apr. 24, 2014

(87) PCT Pub. No.: WO2013/001266
PCT Pub. Date: Jan. 3, 2013

(65) Prior Publication Data
US 2014/0377159 A1 Dec. 25, 2014

(30) Foreign Application Priority Data
Jun. 27, 2011 (GB) .................................. 1110937.8

(51) Int. Cl.
*C01B 31/04* (2006.01)
*B82Y 30/00* (2011.01)
*B82Y 40/00* (2011.01)
*B01J 13/00* (2006.01)

(52) U.S. Cl.
CPC ......... *C01B 31/0492* (2013.01); *B01J 13/0043* (2013.01); *B82Y 30/00* (2013.01); *B82Y 40/00* (2013.01); *C01B 31/0415* (2013.01); *C01B 31/0469* (2013.01); *C01B 31/0484* (2013.01); *C01B 2204/04* (2013.01); *C01B 2204/06* (2013.01)

(58) Field of Classification Search
CPC ............. C01B 31/0492; C01B 31/0484; B01J 13/0043
USPC .................................. 423/445 B; 252/378 R
See application file for complete search history.

(56) References Cited

U.S. PATENT DOCUMENTS

2011/0130494 A1  6/2011  Penicaud et al.

FOREIGN PATENT DOCUMENTS

| CN | 101698476 A | * | 4/2010 |
| CN | 101704520 | | 5/2010 |
| CN | 101830458 | | 9/2010 |
| CN | 101513998 B | * | 1/2011 |
| CN | 101698476 | | 9/2011 |
| EP | 2719662 | | 4/2014 |

(Continued)

OTHER PUBLICATIONS

Zhu, Shoujun, et al. "Strongly green-photoluminescent graphene quantum dots for bioimaging applications." Chem. Commun. 47.24 (2011): 6858-6860.*

(Continued)

*Primary Examiner* — Richard M Rump
(74) *Attorney, Agent, or Firm* — Baker & Hostetler LLP

(57) ABSTRACT

A method for producing a solution of dispersed graphenes comprising contacting graphite having a dimension in the a-b plane of 10 μm or less with an electronic liquid comprising a metal and a polar aprotic solvent, and solutions of dispersed graphenes which may be obtained by such a method are described.

16 Claims, 6 Drawing Sheets

(56) References Cited

FOREIGN PATENT DOCUMENTS

| KR | 2010-0121978 | 11/2010 |
|---|---|---|
| WO | WO 2008/097343 A2 | 8/2008 |
| WO | WO 2010/001128 A1 | 1/2010 |

OTHER PUBLICATIONS

Yang, Qiang, et al. "Fabrication of high-concentration and stable aqueous suspensions of graphene nanosheets by noncovalent functionalization with lignin and cellulose derivatives." The Journal of Physical Chemistry C 114.9 (2010): 3811-3816.*
Behabtu, Natnael, et al. "Spontaneous high-concentration dispersions and liquid crystals of graphene." Nature nanotechnology 5.6 (2010): 406-411.*
Vallés, Cristina, et al. "Solutions of negatively charged graphene sheets and ribbons." Journal of the American Chemical Society 130. 47 (2008): 15802-15804.*
Berger et al., "Ultrathin Epitaxial Graphite: 2D Electron Gas properties and a Route toward Graphene-based Nanoelectronics", The Journal of Physical Chemistry, 2004, B, 108, 19912-19916.
Cai et al., "Thermal Transport in Suspended and Supported Monolayer Graphene Grown by Chemical Vapor Deposition", Nano Letters, 2010, 10, 1645-1651.
Chattopadhyay et al., "Exfoliated soluble graphite", Carbon, Nov. 2009, vol. 47, No. 13, 2945-2949.
Dresselhaus et al., "Intercalation compounds of graphite", Advances in Physics, 2002, 51(1), 188 pages.
Fagan et al., "Comparative Measures of Single-Wall Carbon Nanotube Dispersion", The Journal of Physical Chemistry, 2006, B, 110, 23801-23805.
Hernandez et al., "High-yield production of grapheme by liquid-phase exfoliation of graphite", Nature Nanotechnology, Sep. 2008, vol. 3, No. 9, 563-568.
Jung et al., "Simple Approach for High-Contrast Optical Imaging and Characterization of Graphene-Based Sheets", Nano Letters, 2007, vol. 7, No. 12, 3569-3575.
Khan et al., "Solvent-Exfoliated Graphene at Extremely High Concentration", Langmuir, Jun. 15, 2011, vol. 27, No. 15, 9077-9082.
Li et al., "Large-Area Synthesis of High-Quality and Uniform Graphene Films on Copper Foils", Science, 2009, 324, 1312-1314.
Novikov et al., "Low-Temperature Synthesis of Graphene", Thechnical Physics Letters, Jun. 1, 2011, vol. 37, No. 6, 565-567.
Novoselov et al., "Electric Field Effect in Automatically Thin Carbon Films", Science, 2004, 306, 666-669.
O'Neil et al., "Graphene Dispersion and Exfoliation in Low Boiling Point Solvents", The Journal of Physical Chemistry, Mar. 14, 2011, vol. 115, No. 13, 5422-5428.
Solin et al., "The physics of ternary graphite intercalation compounds", Advances in Physics, 1988, 37(2), 87-254.
Stankovich et al., "Graphene-based composite materials", Nature, Jul. 2006, vol. 442, 282-286.
Stankovich et al., "Synthesis of grapheme-based nanosheets via chemical reduction of exfoliated graphite oxide", Carbon, 2007, 45, 1558-1565.
Vallés et al., "Solutions of Negatively Charged Graphene Sheets and Ribbons", Journal of the American Chemical Society, 2008, 130, 15802-15804.
Supporting Information which accompanied Khan et al., "Solvent-Exfoliated Graphene at Extremely High Concentration", Langmuir, Jun. 15, 2011, 27(15) 9077-9082, 5 pages.
Electronic Supplementary Information (ESI) for "Zhu et al.,Strongly Green-Photoluminescent Graphene Quantum Dots for Bioimaging Applications", Chemical Communications, 2011, 47, 6858-6860, 10 pages.
Supporting Information for "Valles et al., Solutions of Negatively Charged Graphene Sheets and Ribbons, Journal of the American Chemical Society, 2008, 130, 15802-15804", 17 pages.
Catheline et al., "Graphene Solutions", Chem. Communication, Feb. 2011, 47, 5470-5472 (with supporting information).
Milner et al., "Structure and Morphology of Charged Graphene Platelets in Solution by Small-Angle Neutron Scattering", Journal of the American Chemical Society, May 2012, 134, 8302-8305 (with supporting information).

* cited by examiner

GRAPHENE SOLUTIONS

CROSS-REFERENCE TO RELATED APPLICATIONS

This application is the National Stage of International Patent Application No. PCT/GB2012/000550 filed Jun. 26, 2012, which claims the benefit of United Kingdom Patent Application No. 1110937.8, filed Jun. 27, 2011, the disclosures of which are incorporated herein by reference in their entireties.

The present invention relates to methods for dispersing graphite to produce solutions comprising high concentrations of graphenes, in particular individual graphene sheets.

Graphite is an allotrope of carbon, in which the atoms are bonded together hexagonally to form layers. The individual layers of graphite, which are one atom thick, are known as graphene. Isolated graphene is a new class of 2D material which is a free-standing atomically thin 2D crystal and has great potential for use in many applications, including nano-electronics, sensors, ultrathin coatings, composites, batteries, supercapacitors and hydrogen storage. It has been studied theoretically for many years but the first expenmental samples were not produced until 2004.

However, it has proved difficult to manufacture graphene in bulk. A key challenge in this regard is its tendency to form aggregates, scrolls and folds when placed in liquids. Hence, it has proved very difficult to produce solutions of flat individual graphene sheets. To date, techniques employed include using micromechanical cleavage of bulk graphite, by effectively drawing or by peeling with adhesive tape (Novoselov et al., Science 2004, 306, 666-669); epitaxial growth from chemical vapour deposition of hydrocarbons (Cai et al., Nano Lett., 2010, 10, 1645-1651 and Li et al., Science 2009, 324, 1312) and by thermal decomposition of SiC (Berger et al., J. Phys. Chem. B, 2004, 108, 19912-19916). However, the problem associated with all of these methods is that the yield of graphene obtained is low and the graphene is difficult to find, requiring labour intensive and expensive processes. Furthermore, the nature of the methods required mean that such processes are not suitable for scale-up to the industrial proportions required for many widespread applications, for example, where the intention is to manipulate the graphene into plastics to form composites, or to form microporous electrodes for electrochemical devices.

It has long been known that it is possible to intercalate species in between the layers which form graphite bulk, to form chemically-distinct three dimensional structures. An example of where such a technique has been used to produce graphene is by chemical exfoliation. However, chemical exfoliation involving acid or other oxidative treatments produces functionalised graphite oxide. Although graphite oxide can be exfoliated to form graphene oxide, (Stankovich et al., Nature, 2006, 442, 282-286) it has a much lower electrical conductivity than graphene, since the physical and electronic structure of graphene is adversely affected (Jung et al., Nano Lett (2007), 7, 3569-3575). Further steps are necessary to convert the graphite oxide to graphene in order for most potential applications to be possible (Stankovich et al., Carbon, 2007, 45, 1558-1565); however, this reduction of graphite/graphene oxide does not recover the original graphite/graphene properties fully, due to the formation of vacancies and other defects in the lattice (Stankovich et al., Carbon, 2007, 45, 1558-1565). Another method for dispersing graphene is low power bath sonication of graphite powder for 30 mins in certain organic solvents, for example, N-methylpyrrolidinone (NMP), followed by centrifugation (Hernandez et al., Nature Nano. (2008), 3, 563-568). This process results in a dispersion containing an inhomogeneous mixture of mono- and multilayer graphene flakes with overall concentrations of about 0.01 mgml$^{-1}$. The authors describe that the yield of monolayer graphene is approximately 1 wt %. It has also been shown that mixing graphite with a potassium-naphthalene solution followed by washing in THF and drying results in a graphite intercalation compound which can then be dispersed to low concentrations in NMP (Valles et al., J. Am. Chem. Soc. (2008), 130, 15802-15804), although contaminated with napthalene.

Hence, there is a need for a simple yet effective method for producing a solution comprising a high concentration of unscrolled and unfolded graphenes, wherein the method can be scaled up easily to industrial proportions.

In this regard, the present inventors have found that a solution of flat, unscrolled and unfolded, dispersed graphenes can be produced by using an electronic liquid, without the need to introduce an organic charge transfer agent.

More specifically, the present invention provides a method for producing a solution of dispersed graphenes comprising contacting graphite having a dimension in the a-b plane of 10 μm or less with an electronic liquid comprising a metal and a polar aprotic solvent.

In particular, the present inventors have found that, provided the size of the graphite starting material is controlled carefully, it is possible to use an electronic liquid for dispersing graphite into graphenes. It is surprising that such a technique can be used in the field of graphite for several reasons. Firstly, graphene is a 2D structure and there is no direct correlation between techniques which work for 1D and 2D structures, respectively. Secondly, it is well known by the skilled person that graphite does not dissolve spontaneously in electronic liquids (see for example, Enoki et al., OUP USA (April 2003) and Solin et al., Advances in Physics, 37(2): 87-254, 1988). In this regard, the present inventors are the first to have identified that, where the a-b dimensions of the graphite starting material are controlled to be below a particular limit, an electronic liquid may be used to disperse graphite into graphene sheets to produce high concentration solutions of dispersed graphenes. Advantageously, the graphenes produced are non-agglomerated, unfolded and unscrolled. This is most likely due to electrostatic effects.

In one embodiment, the a-b planes of the graphite starting material terminate at a free surface, rather than a grain boundary or other solid state interface. The chemistry of the surface termination may vary or be varied deliberately, although hydrogen termination is most common.

Furthermore, the inventors have found that using the method of the present invention, it is possible to control the shape and dimensions of the graphene obtained by selecting the graphite starting material. In this regard, the inventors have found that the non-destructive nature of the method of the present invention, in particular the absence of extensive sonication or aggressive oxidation chemistry, means that the shape of the starting material is preserved. For example, if the graphite has elongated dimensions then these elongated dimensions will be preserved in the dispersed graphenes obtained. In this way, it is possible to control whether the graphene is in the form of equiaxed sheets, ribbons, or other geometric shapes, for example. These shapes are potentially advantageous for integration and design of active devices, or optimisation of composite reinforcement properties.

In a further aspect, the present invention provides a solution of dispersed graphenes, comprising graphenes at a concentration of at least 1 mg/ml and a solvent. It has not previously been possible to obtain solutions having a high concentration of dispersed graphenes. A high concentration is desirable for further manipulation and is important when considering whether the method is suitable for scale-up. A further advantage is that a high concentration solution of dispersed graphenes can be produced without the need for extensive sonication. At sufficiently high concentration, useful ordered liquids may form, for example as a discotic liquid crystal.

In a yet further embodiment, the present invention provides a solution of mono-dispersed graphcnes, comprising mono-dispersed individual graphenes at a concentration of at least 0.01 mg/ml and a solvent. In a further embodiment, the present invention provides a solution of individual monolayer graphenes, comprising individual monolayer graphenes at a concentration of at least 0.01 mg/ml and a solvent.

The term "mono-dispersed" is used herein to describe a solution wherein the dispersed individual graphenes comprised within the solution all have essentially the same dimensions i.e. the same size and shape. In particular, the term "mono-dipsersed" is used to describe a solution wherein the dimensions of the individual dispersed graphenes which comprise the solution have a standard deviation of less than about 20%, in one embodiment, less than about 15%, in another embodiment, less than about 10%, in a further embodiment, less than about 5%.

The term "graphenes" is used herein to describe graphene products which may contain up to and including four individual layers of graphene. As a consequence of the method of the present invention, the graphenes are dispersed which means that each graphene, whether it is mono-layer, bi-layer, hi-layer or 4-layer is a separate individual moiety. Single layer graphene has been the focus of the most intense scrutiny, but graphenes with small numbers of layers have distinct characteristics to each other and to bulk graphite, and may be of practical interest. The method of the present invention provides scope for new separation methods based on adjustment of the metal to carbon ratio or selective quenching of the charge on the reduced graphenes. Alternatively, it provides a means to separate mixtures of graphenes based on established methods such as ultracentrifugation.

In the method of the present invention, the graphite having a dimension in the a-b plane of about 10 μm or less is contacted with an electronic liquid.

As described above, the present inventors have found that it is possible to use electronic liquids to disperse graphite into graphenes if the size of the graphite starting material is controlled carefully. In this regard, the graphite which is contacted with the electronic liquid has a dimension in the a-b plane of the graphite of about 10 μm or less, about 5000 nm or less, about 3000 nm or less, about 1000 nm or less, about 750 nm or less, about 500 nm or less, about 250 nm or less. In one embodiment of the method of the present invention, the graphite has one dimension in the a-b plane of the graphite which is 10 μm or less, about 5000 nm or less, about 3000 nm or less, about 1000 nm or less, about 750 nm or less, about 500 nm or less, about 250 nm or less. In an alternative embodiment, the graphite has two dimensions, at least one of which is in the a-b plane, which are about 10 μm or less, about 5000 nm or less, about 3000 nm or less, about 1000 nm or less, about 750 nm or less, about 500 nm or less, about 250 nm or less. In a further embodiment, all three dimensions of the graphite are 10 μm or less, about 5000 nm or less, about 3000 nm or less, about 1000 nm or less, about 750 nm or less, about 500 nm or less, about 250 nm or less, about 100 nm or less.

An example of graphite starting material which is particularly useful in the method of the present invention is graphite having dimensions which are confined in the a-b plane but not in the c-plane i.e. graphite which has dimensions in the a-b plane which are about 10 μm or less, about 5000 nm or less, about 3000 nm or less, about 1000 nm or less, about 750 nm or less, about 500 nm or less, about 250 nm or less. In such graphite material, grain boundaries in the a-b plane are minimised which is advantageous from the point of view of separating the graphene sheets which form the bulk graphite material. In one embodiment, the individual sheets which form such graphite starting material terminate in the a-b plane at the surface of the graphite. An example of such a starting material is a nanoplatelet stack. An example of such a material is illustrated in FIGS. 1, 2A and 2B. Further examples of nanoplatelet stacks include "stacked-cup" or "herringbone" nanofibres. In one embodiment, the dimensions of the nanoplatelet stack may be such that it has a truncated cone morphology.

Alternative examples of suitable graphite starting materials include carbon discs, in particular those having a diameter in the range from 0.5 to 3 μm and a thickness in the range from 20 to 50 nm, and carbon cones, for example carbon cones having a diameter in the range from 0.3 to 0.8 μm and a thickness in the range from 20 to 50 nm. Such materials are readily grown by established CVD processes and are available commercially.

The term "electronic liquid" is used herein to describe the liquids which are formed when a metal, such as an alkaline earth metal or an alkali metal, for example, sodium, dissolves without chemical reaction into a polar aprotic solvent—the prototypical example being ammonia. This process releases electrons into the solvent forming a highly reducing solution. The layer structure of graphite means that in the method of the present invention, the metal-polar aprotic solvent is intercalated between the layers of graphite i.e. between the graphene layers which has the effect of charging the graphite. In this regard, the solvated electrons present in the electronic liquid readily reduce the graphene.

As has been described above, a key challenge in the synthesis of graphene in bulk quantities has been its tendency to form agglomerates, scrolls and folds in liquids. This is a problem which has been overcome by the method of the present invention. Reduction in an electronic liquid, such as ammonia or methylamine, is a powerful approach because electrostatic repulsion separates the graphene layers and it has been found that this charged entity can then be dispersed in a polar aprotic solvent. By limiting the size of the a-b dimensions of the graphite starting material, defects or strain effects that would ordinarily pin the layers of the graphite together can be avoided which allows for efficient dissolution (Dresselhaus, Adv. Phys., 2002, 51(1), p. 32; Solin & Zabel, Adv. Phys. (1988), 32(2), 87-284). This effect can also be minimised by selecting the graphite starting material such that the a-b planes of the graphite starting material terminate at a free surface, rather than a grain boundary or other solid state interface.

The metal used in the method of the present invention is a metal which dissolves in a polar aprotic solvent, in particular an amine solvent, to form an electronic liquid. The person skilled in the art will be familiar with appropriate metals. Preferably, the metal is selected from the group consisting of alkali metals and alkaline earth metals. Preferably, the metal is an alkali metal, in particular, lithium, sodium or potassium. Preferably, the metal is sodium or potassium. In one embodiment, the metal is sodium. In alternative embodiment, the metal is potassium. In one embodiment, a mixture of metals may be used to form the electronic liquid.

In one embodiment, the metal may be an alkaline earth metal such as calcium. Where such a divalent cation is used, in the step in which the graphite is contacted with the electronic liquid, the graphite expands and two molecular layers of amine solvent are spontaneously absorbed. This produces a graphite intercalation compound, which may be transient or isolated, wherein the graphene layers are separated by approximately 10 Å. This may be advantageous because a gel phase is created whereby the graphite remains oriented in the original stacking direction but the individual graphene sheets are separated from each other and the interlayer cations.

It is advantageous to control carefully the amount of metal included in the solution. Therefore, preferably the metal is present in an amount such that the ratio of metal atoms in the electronic liquid to carbon atoms in the graphite with which the electronic liquid is contacted is about 1:6 or less, preferably about 1:8 or less, preferably about 1:10 or less, preferably about 1:15 or less, preferably about 1:20 or less, preferably about 1:30 or less, preferably about 1:40 or less, preferably about 1:50 or less. In some embodiments, the metal is present in an amount such that the ratio of metal atoms in the electronic liquid to carbon atoms in the graphite with which the electronic liquid is contacted is in the range from about 1:6 to about 1:75, about 1:8 to about 1:50, about 1:10 to about 1:40, about 1:15 to about 1:30, about 1:20 to about 1:30. The molar ratio of metal to carbon atoms can be determined from their relative masses by simple calculations with which the person skilled in the art will be familiar.

In the method of the present invention, an electronic liquid is formed by dissolving the metal in a polar aprotic solvent. Polar aprotic solvents do not have an acidic hydrogen and are able to stabilize ions. The skilled person will be familiar with suitable polar aprotic solvents for use in the method of the present invention. The polar aprotic solvent may be selected from the group consisting of tetrahydrofuran, dimethyl sulfoxide, ethers such as dioxane, amides such as dimethylformamide and hexamethylphosphorotriamide, N-methyl pyrolidone, acetonitrile, $CS_2$, and amine solvents such as ammonia and methylamine In one embodiment, preferably the polar aprotic solvent is an amine solvent. In some embodiments, the amine solvent may be a $C_1$ to $C_{12}$ amine, a $C_1$ to $C_{10}$ amine, a $C_1$ to $C_8$ amine, a $C_1$ to $C_6$ amine, a $C_1$ to $C_4$ amine. The amine solvent is preferably selected from ammonia, methylamine or ethylamine. In one embodiment, the amine solvent is ammonia. In an alternative embodiment, the amine solvent is methylamine.

In one embodiment, the electronic liquid is formed by contacting metal with a polar aprotic solvent, preferably an amine solvent in a ratio of about 1:2, about 1:3, about 1:4, about 1:5, about 1:6, about 1:7. In one embodiment, the electronic liquid is formed by contacting metal with a polar aprotic solvent, preferably an amine solvent in a ratio in the range from about 1:2 to about 1:10, preferably about 1:4 to about 1:8.

In one embodiment, the metal is an alkali metal and solvent is an amine solvent.

In one embodiment, the metal is sodium and the amine solvent is ammonia.

In one embodiment, the metal is potassium and the amine solvent is ammonia.

In one embodiment, the metal is sodium and the amine solvent is methylamine.

In one embodiment, where the dimensions of the graphite starting material are such that the graphenes produced by the method of the present invention are soluble in the polar aprotic solvent which forms the electronic liquid, the product obtained by contacting the graphite starting material with the electronic liquid is a solution of dispersed graphenes.

In an alternative embodiment where the dimensions of the graphite starting material are such that the dispersed graphenes produced by the method of the present invention are not soluble in the polar aprotic solvent which forms the electronic liquid, the product obtained by contacting the graphite starting material with the electronic liquid is a graphite intercalation compound.

The term "graphite intercalation compound" is used to refer to complex materials having formula $XC_y$, where element or molecule X is inserted between the layers of graphene which make up the graphite. In a graphite intercalation compound, the graphene layers remain intact and the guest molecules or atoms are located in between. In the method of the present invention, the guest species X is the electronic liquid and hence metal atoms, amine solvent and solvated electrons will be intercalated between the graphene layers. A "binary" graphite intercalation compound is one where there is one guest species X located between the graphene layers. A "ternary" graphite intercalation compound has the formula $XYC_y$, and is one where there are two guest species, X and Y, located between the graphene layers. A "quartenary" graphite intercalation compound has the formula $XYZC_y$, and is one where there are three guest species, X, Y and Z, located between the graphene layers. The graphite intercalation compounds formed in the method of the present invention are predominantly ternary or quartenary graphite intercalation compounds due to the fact that the electronic liquid itself includes several components.

Where a graphite intercalation compound is formed in the first step of the method of the present invention, the graphite intercalation compound may then be contacted with a second polar aprotic solvent to form a solution of dispersed graphenes.

In one embodiment, the graphite intercalation compound is isolated from the excess liquid prior to contact with the second polar aprotic solvent. In an alternative embodiment, the graphite intercalation compound is contacted with the second polar aprotic solvent directly after contact with the electronic liquid i.e. without prior removal of the excess liquid such that all the initial polar aprotic solvent is still present during the second step.

In one embodiment, the second polar aprotic solvent is selected from the group consisting of tetrahydrofuran, dimethyl sulfoxide, ethers such as dioxane, amides such as dimethylformamide and hexamethylphosphorotriamide, N-methyl pyrolidone, acetonitrile, $CS_2$, and amine solvents, such as ammonia and methylamine. In one embodiment, the polar aprotic solvent is tetrahydrofuran.

In an alternative embodiment, the second polar aprotic solvent is the same as the polar aprotic solvent of the electronic liquid.

It is preferred to exclude air and moisture from the system by ensuring that all materials are dry and oxygen-free. The skilled person will appreciate that it is not possible to establish a completely oxygen-free environment. Thus, as used herein, the term "oxygen-free" refers to an environment in which the content of oxygen is about 5 ppm or less.

As a consequence of the first step of contacting the graphite with an electronic liquid, when the graphite intercalation compound is contacted with a second polar aprotic solvent, a solution of dispersed graphenes is produced.

The morphology of the graphene obtained will depend on the morphology of the graphite starting material. In this regard, the inventors have found that the method of the present invention allows for the original shape and size of the graphene layers of the graphite starting material to be preserved. Accordingly, in one embodiment, the dispersed graphenes may be in the form of sheets. In an alternative embodiment, the dispersed graphenes may be in the form of ribbons. In an alternative embodiment, the dispersed graphenes may be in the form of discs. In an alternative embodiment, the dispersed graphenes may be in the form of cones. In an alternative embodiment, the dispersed graphenes may be in the form of truncated cones. In an alternative embodiment, the dispersed graphenes may be in the form of herringbones.

The solution of dispersed graphenes produced by the method of the present invention may comprise a mixture of mono-, bi-, tri- and 4-layer graphenes. In an alternative embodiment, a solution which comprises only mono-, bi- and tri-layer graphenes is produced. In an alternative embodiment, a solution which comprises mono- and bi-layer graphenes is produced.

In a preferred embodiment, the solution produced by the method of the present invention is a solution of dispersed, individual mono-layer graphene.

In an alternative embodiment, the solution produced by the method of the present invention is a solution of dispersed, individual bi-layer graphene.

In an alternative embodiment, the solution produced by the method of the present invention is a solution of dispersed, individual tri-layer graphene.

In one embodiment, the dispersed graphene is in the form of discs having a thickness in solution in the range from 0.3 to 1.5 nm and a radius in the range from 100 to 300 nm.

The product of the method of the present invention is a solution of dispersed graphenes in a solvent, preferably a polar aprotic solvent as defined herein. Preferably the product of the method of the present invention is a solution of dispersed, individual mono-layers of graphene in a solvent, preferably a polar aprotic solvent as defined herein. As a consequence of the method of dispersion, the dispersed graphenes will be charged. This is advantageous because, without wishing to be bound by theory, it is believed that it is this charge which makes it possible to form graphene sheets which are non-agglomerated, unscrolled and unfolded in solution, an advantage as compared to sonication techniques which produce graphene which is agglomerated, scrolled or folded.

The person skilled in the art will be familiar with techniques which may be used to confirm the presence of dispersed graphenes. An example of a suitable technique is small angle neutron scattering (SANS). Details of the SANS technique are described in Fagan et al., J Phys Chem B., (2006), 110, 23801.

SANS is a powerful technique for probing the structure of graphenes in solution. More specifically, SANS can be used to determine whether the graphene is present as isolated species or in agglomerated form. SANS can provide information on the structure of large particles in solution (typically those in the range from 0.1 to 1000 nm). Specifically, it can provide unique information about the shape of dissolved particles and their concentration in solution. The SANS intensity, I, is usually measured as a function of the momentum transfer Q. At intermediate Q-values, I(Q) is proportional to $Q^{-D}$, where D is the fractal dimension of the dissolved particles/graphenes. Thus, the expected SANS pattern for fully dispersed platerod-like objects (i.e. D≈2) such as graphenes is $Q^{-2}$ behaviour. Dispersions of otherwise, non-mono-dispersions of graphenes, i.e. those consisting of agglomerates or scrolled or folded graphenes will, on the other hand, exhibit a larger fractal dimensions, typically from 3 to 5.

The SANS technique is very sensitive to the presence of larger particles and hence if agglomerates are present in the solution under test then the SANS signal will be dominated by these agglomerates. Hence, the SANS results obtained for solutions according to the present invention clearly include very few agglomerates.

In one embodiment, of the present invention, dispersed, unscrolled and unfolded graphenes comprise about 80 vol % or more, about 85 vol % or more, about 90 vol % or more, about 95 vol % or more, about 98 vol % or more of the species present in solution, as measured by SANS.

In one embodiment, of the present invention, mono-dispersed, unscrolled and unfolded graphenes comprise about 80 vol % or more, about 85 vol % or more, about 90 vol % or more, about 95 vol % or more, about 98 vol % or more of the species present in solution, as measured by SANS.

In one embodiment, of the present invention, monolayer, unscrolled and unfolded graphenes comprise about 80 vol % or more, about 85 vol % or more, about 90 vol % or more, about 95 vol % or more, about 98 vol % or more of the species present in solution, as measured by SANS.

A further technique which may be used to confirm the presence of individual graphene is atomic force microscopy (AFM).

It has been found that, where the method of the present invention is employed, it is possible to obtain surprisingly high concentrations of dispersed graphenes, in particular, dispersed individual mono-layers of graphene. More specifically, prior to the present invention it was very difficult to obtain bulk quantities of graphene. For example, Valles et al., J. Am Chem. Soc. 2008, 130, 15802 to 15804, describe a method for obtaining solutions of negatively charged graphene sheets and ribbons and report a concentration of only 0.15 mg/ml of dissolved material. In contrast, using the method of the present invention, the inventors have achieved concentrations of dispersed graphenes of about 1 mg/ml or greater, about 5 mg/ml or greater, about 10 mg/ml or greater. Furthermore, the inventors have achieved concentrations of mono-dispersed individual graphenes of about 0.01 mg/ml or greater, about 0.05 mg/ml or greater, about 0.1 mg/ml or greater, about 0.5 mg/ml or greater, about 1 mg/ml or greater, about 5 mg/ml or greater, about 10 mg/ml or greater. In this regard, using the method of the present invention, it is possible to produce solutions which comprise one type of graphene, be it mono-layer, bi-layer, tri-layer or 4-layer graphene, at high concentration. Preferably, the concentration of individual mono-layers of graphene in the solution is about 1 mg/ml or greater about 5 mg/ml or greater, about 10 mg/ml or greater.

The method of the present invention provides a product which is a very useful starting material for a number of applications, including nanoelectronics, sensors, ultrathin coatings, composites, batteries, supercapacitors and hydrogen storage. The ability to produce bulk quantities of individual graphenes means that the method is suitable for scale-up to industrial proportions.

After producing a solution of dispersed graphenes, optionally one or more further steps may be carried out. In particular, the dispersion of graphenes may be purified, functionalised and/or separated on the basis of size.

Optionally, where the solution of dispersed graphenes includes a mixture of different graphenes, e.g. a mixture of mono-, bi-, tri- and/or 4 layer graphenes, the graphenes may be separated using centrifugation.

In one embodiment, the dispersed graphenes may be transferred to a different solvent, in particular a different third polar aprotic solvent. The third polar aprotic solvent may be selected from the group consisting of tetrahydrofuran, dimethyl sulfoxide, ethers such as dioxane, amides such as dimethylformamide, N-methyl pyrolidone, dimethyl acetamide and hexamethylphosphorotriamide, acetonitrile, $CS_2$, and amine solvents, such as ammonia and methylamine. In one embodiment, the third polar aprotic solvent is tetrahydrofuran. In an alternative embodiment, the third polar aprotic solvent is dimethyl formamide (DMF). Preferably, the third polar aprotic solvent is dry and oxygen-free.

In one case, the dispersed graphenes may be separated by gradual quenching of the charge using a suitable quenching agent, including but not limited to $O_2$, $H_2O$, $I_2$, and alcohols (or other protic species). As the quenching agent is added, the species with the highest energy electrons will be deposited first. By adding appropriate stoichiometric quantities, the desired fractions may be separated. For example, the fractions precipitated after neutralising predetermined amounts of the total charge may be collected.

Alternatively or in addition to chemical quenching, an electrochemical quenching method may be used. In this case the additional charge on the individual graphene-based anions is removed by applying a voltage to an (otherwise inert) electrode placed in the dispersion of graphenes.

By controlling the potential of the electrode, graphenes of different electron affinities can be oxidised and precipitated onto the electrode. The electrode (or series of working electrodes) may be held at fixed potential(s), in potentiostatic mode. A counter electrode may also be provided, preferably in a remote, though ionically-linked compartment, at which the metal ion is reduced and recovered. A reference electrode may be used to control the potential at the working electrode accurately.

Alternatively, or in an additional step, the solvent may gradually be removed, causing the heaviest/least charged species to deposit first. These two mechanisms allow separation by, for example, graphene dimensions on the one hand, and graphene electronic character on the other.

Optionally, quenching agents, including but not limited to RI, wherein R is a hydrocarbon group, can be used to chemically modify the graphenes. By carrying out the reaction on dispersions of graphenes, an ideally uniform functionalisation is achieved because the graphenes are flat and non-agglomerated.

Optionally, a solution of (previously separated) graphenes can be destabilised slowly (by quenching or solvent removal) to crystallise the graphenes.

Alternatively or in addition, individualised, dispersed graphenes, may be further separated according to size by chomatography in a dry environment.

Optionally, the charged dispersed graphenes can be transferred to other dry organic solvents, such as dimethyl formamide (DMF), dimethylacetamide (DMA) and N-methylpyrolidone (NMP), for further processing.

The present invention will now be described further by reference to the following figures and examples which are in no way intended to limit the scope of the invention.

Figure 5:
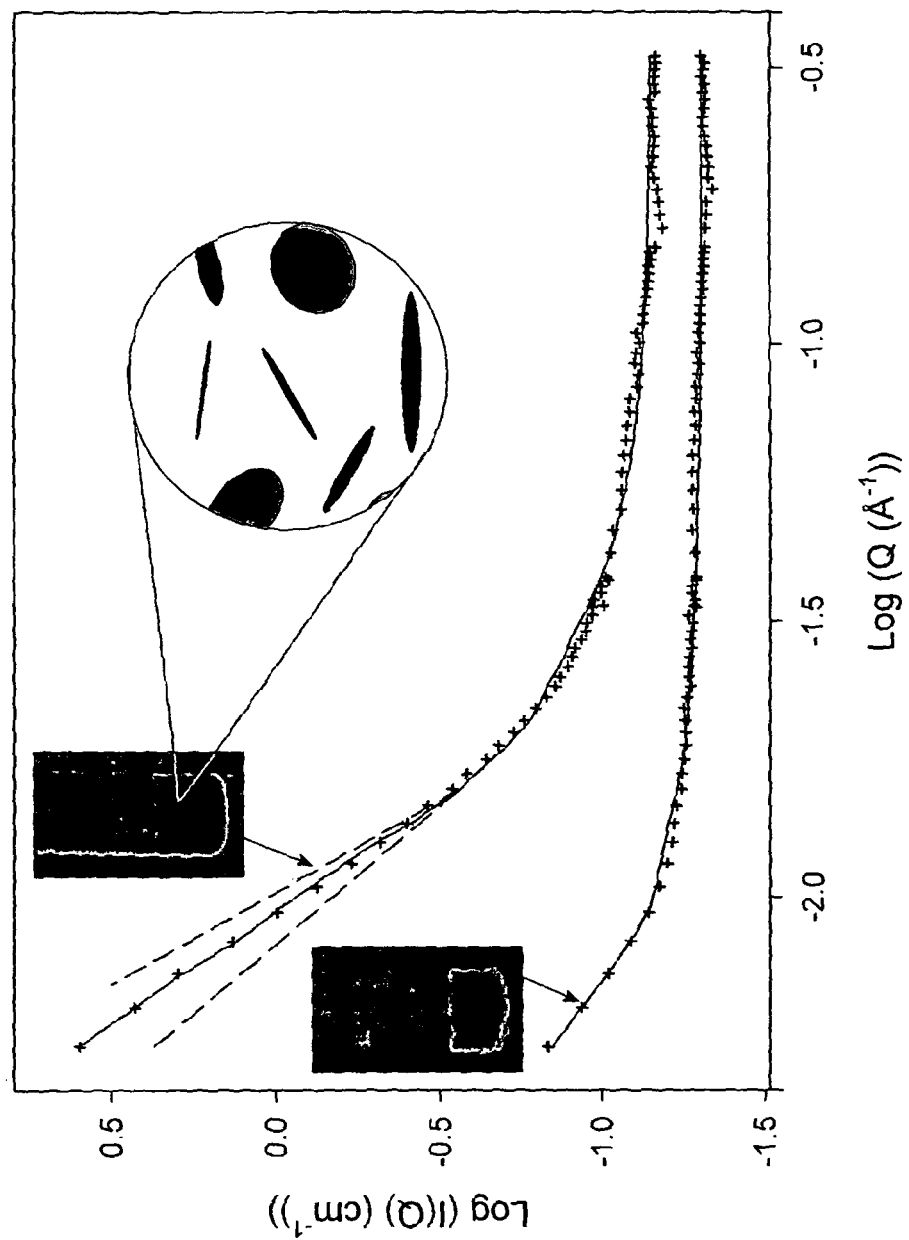
Figure 6:
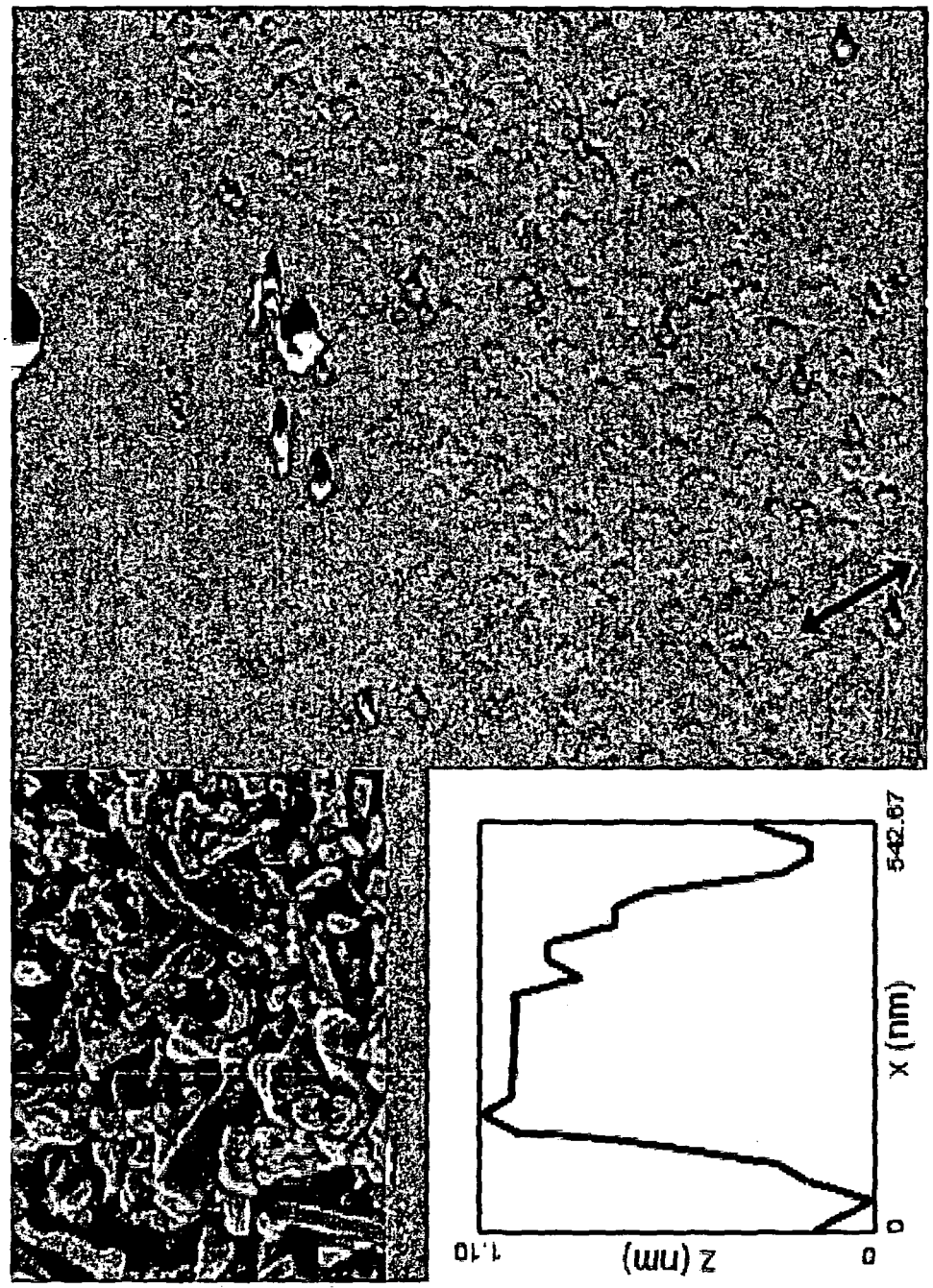

FIG. 5 is a plot of SANS data (represented by points) and fits (shown as lines) for $KC_{48}$ charged platelets in d-THF at concentrations of 0.1 wt % (top) and 0.01 wt % (bottom) wherein the dashed lines show reference plots with gradients of −2 and 3, also shown are photographs of the solution samples and a schematic diagram of the platelets in solution; and FIG. 6 is an AFM image showing single graphene nanoplatelets, the presence of which is confirmed by height profiles (bottom left) and the SEM of undispersed nanoplatelet stacks shown for reference (top left).

EXAMPLE 1

Nanographite platelet fibres were outgassed at a temperature of about 400° C. and a pressure of about $1\times10^{-6}$ mbar to remove adsorbed species. The nanographite platelet fibres were cleaned by soaking overnight in 1 molar HCl and then rinsed thoroughly with de-ionised water by vacuum filtration. The nanocarbon was left to dry or dried on a hot-plate then outgassed in a tube in a furnace at 350-500° C. under vacuum for as long as it took to evacuate to $\leq 1\times10^{-6}$ mbar (up to 2 days). This procedure removed most of the catalyst metal and amorphous carbon.

Figure 1:
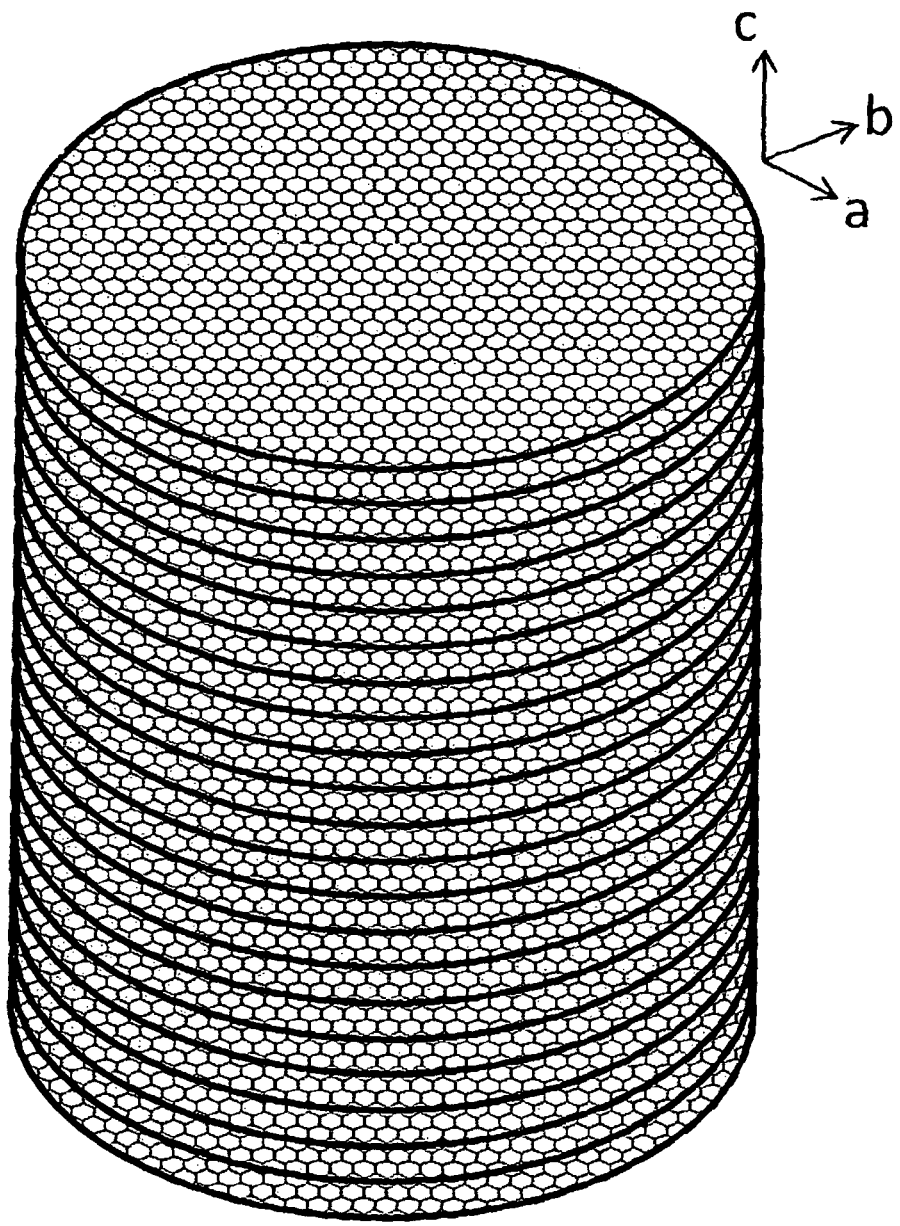
FIG. 1 is a schematic representation of a nanoplatelet stack which may be used as the graphite starting material in the method of the present invention.
Figure 2A:
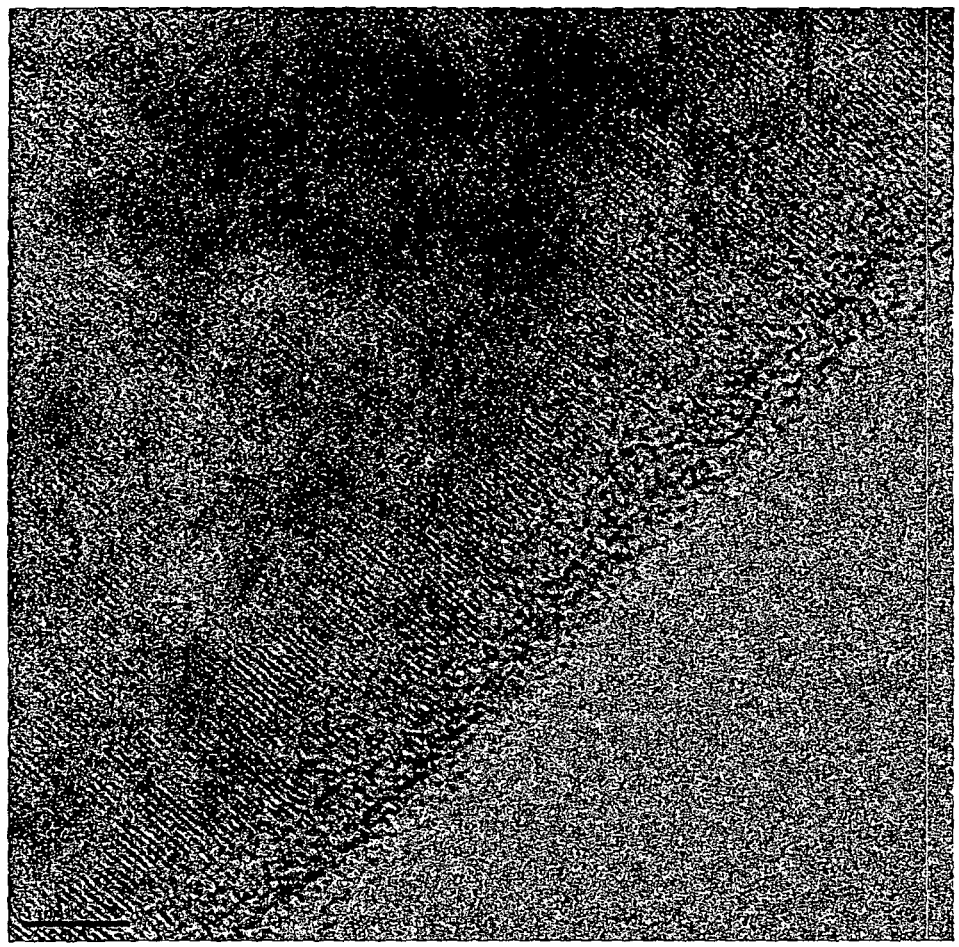
FIGS. 2A and 2B are TEM images of a nanoplatelet stack which is an example of suitable graphite starting material wherein the images clearly show the perpendicular and continuous nature of the graphene layers, in addition to the terminated surface.
Figure 2B:
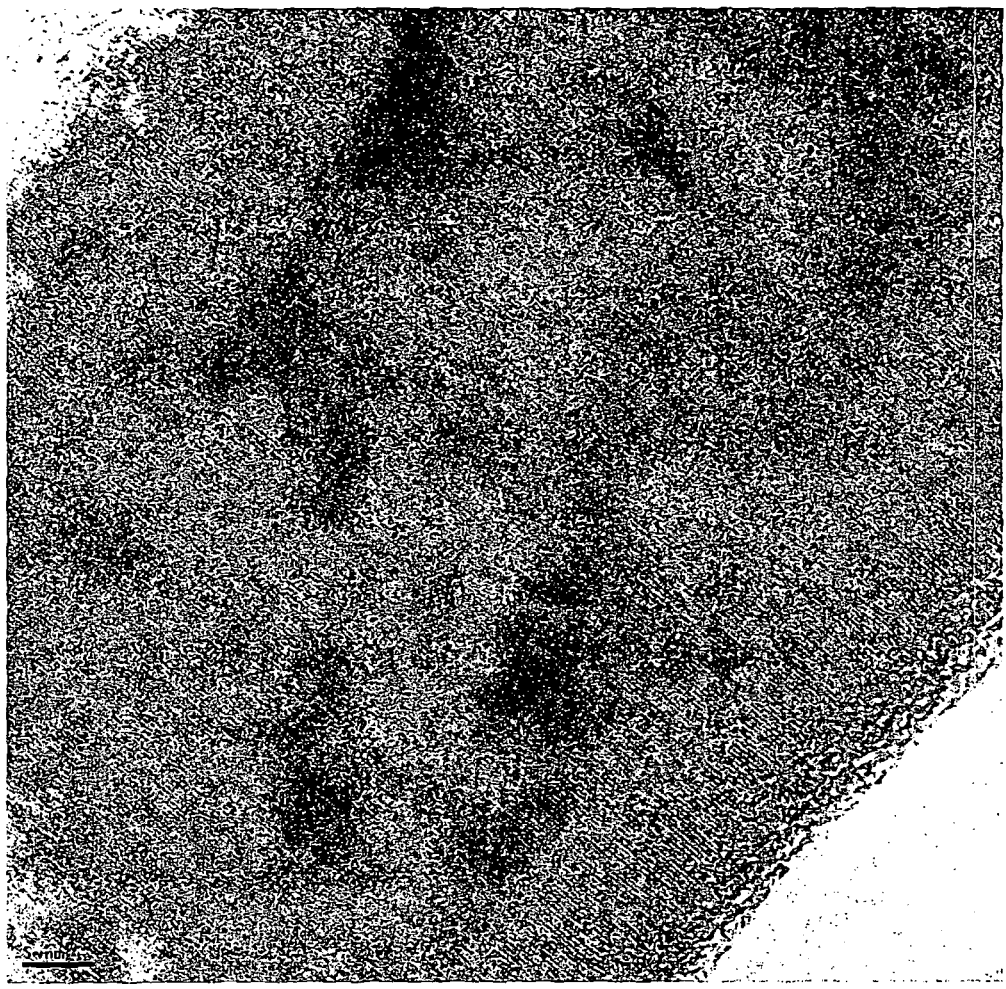

Liquid ammonia was then condensed onto the cleaned and outgassed nanographite platelet fibres and potassium at 230K such that the stoichiometric ratio of potassium to carbon in the nanographite platelet fibres was 1:48. This was followed by removal of the ammonia to leave a graphite intercalation compound. The nanographite platelet fibre starting material had a diameter in the range from 100 to 250 nm i.e. a dimension in the a-b plane of less than 10 µm and a length in the range from 0.5 to 3 µm. The fibres of the starting material comprised bands of graphene layers arranged perpendicular to the axis of the fibres. (see FIG. 1) with free edges. The graphite intercalation compound, having a $KC_{48}$ composition, was contacted with THF to form a solution of dispersed individual graphene.

The concentration of individual graphene present in the solution was determined to be approximately 4 mg/ml by SANS analysis. Hence, the dispersed graphenes accounted for greater than 98 vol % of the species present in the solution. This is clear evidence that a high concentration of dispersed mono-layer graphenes, which are non-agglomerated, non-folded and non-scrolled, was produced.

Figure 3:
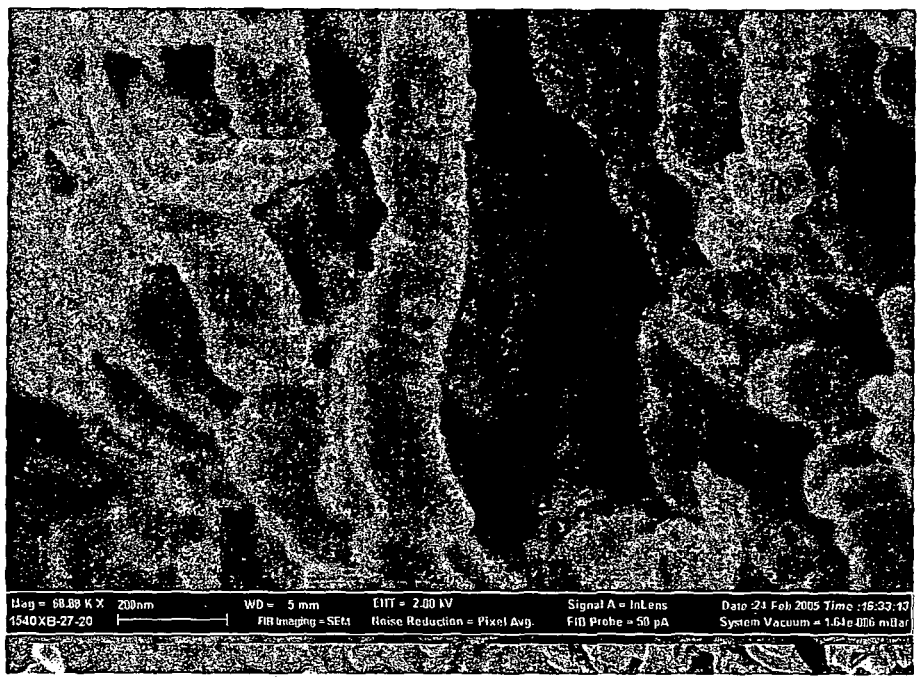
FIG. 3 is an SEM image of uncharged graphite nanoplatelet stacks wherein it can be seen that the fibres comprise graphite layers ("platelets") grown perpendicular to the axis of the fibre at the graphitic interplanar spacing of 3.35 Å.

Solution samples in deuterated THF at concentrations of 0.1 wt % and 0.01 wt %, respectively were prepared. These samples was analysed using SANS and AFM techniques and the results are presented in FIGS. 3 and 4 respectively.

More specifically, the samples were contained in PTFE-sealed 2 mm light path flat-plate rectangular Quartz Suprasil cells. Neutron scattering experiments were performed on these samples using D11, a SANS instrument at the Institute Laue-Langevin (Grenoble) with an approximate Q-range of $5\times10^{-4}$ to 0.44 Å$^{-1}$. During the experiment in question, neutrons of 6 Å wavelength were to give a Q-range of ~0.0022 to 0.33 Å$^{-1}$. Alignment, calibration and background measurements were recorded on Teflon-PTFE, cadmium, the empty beam, water in a 1 mm cell, an empty (2 mm) cell and d-THF. The samples were held in a movable sample changer whilst SANS runs were measured at detector distances of 1.1 m, 2.5 m, 10.0 m and 20.0 m with collimator distances of 8.0 m, 2.5 m, 10.5 m and 20.5 m respectively (transmission runs were measured at a detector distance of 5.0 m and a collimator distance of 5.5 m). Runs ranged in duration from 5 minutes to ~3 hours, depending on neutron flux/intensity. Solvent-subtracted data was obtained by correcting, reducing and radially averaging the raw data then subtracting the solvent and the background. The intensity of the data from the different detector distances was scaled appropriately, giving a continuous spectrum in I(Q) across the Q range for each sample. Plots of log[I(Q)] vs. log[Q] for each sample were then analysed and fitted, as shown in FIG. 5.

The gradient of a plot, or of a section of a plot, corresponds to its fractal dimension, which describes how completely a fractal fills space, thereby indicating the general structure of the solution. Gradients over the intermediate Q range of the samples studied here were found to be −2.2±0.1 for the 0.1 wt % solution and −1.9±0.1 for the 0.01 wt % solution. These gradients signify fractal dimensions consistent with the dominant presence of lamellae, platelets and discs, i.e. dispersed graphenes.

More detailed information on the shape and concentration of the particles in solution was obtained by using the program FISH, a data-fitting program employing a standard iterative linear least squares method in which first derivatives are computed for each calculated data point with respect to each parameter in the model (http://www.small-anale.ac.uk/small-angle/software/FISH.html and Heenan, RAL Report 89-129 (2005), "The "FISH" Reference Manual (Data Fitting Program for Small Angle Diffraction etc.)). The model that best represents the SANS scattering from the solutions produced according to the method of the present invention contains particles of two distinct types: (1) discs of thickness ~3 to 4 Å and radius of approximately 500 to 1000 Å, and; (2) cylinders of height approximately 500 Å and radius 500 to 1500 Å. The fits therefore demonstrate that the nanocarbon solutions comprise two types of graphite nanoplatelet stacks in solution; (1) individual dispersed graphene sheets (2) larger multilayer stacks of nanographite of up to approximately ~250 graphene sheets. However, even if their volume is considered, type 1 (individual graphene) is found to be the strongly dominant species.

FIG. 5 shows fitted SANS data for potassium-charged graphite nanoplatelets of composition $KC_{48}$ in d-THF at concentrations of 0.1 wt % and 0.01 wt %. Also plotted are lines of gradient −2 and −3, in order to show how the gradients for the data and fit plots compare.

Table 1 shows the best fit parameters for SANS data of solutions prepared at 0.1 and 0.01 wt % nanographite. The model that best represents these data contains particles of two types: (1) thin discs of thickness (Length 1) ~3 to 4 Å (i.e. individual dispersed graphenes) and (2) agglomerates of heights (Length 2) ~500 Å. The radii of these types are in the range 500 to 1500 Å as is consistent with the known size distribution of the starting material and also the fact that the graphenes occur as flat (i.e. not folded over) discs. The volume % of each type (Proportion 1 and Proportion 2) shows that the strongly dominant species is individually dispersed graphene.

| Total concentration nanographite | | 0.1 wt % | 0.01 wt % |
|---|---|---|---|
| Type 1: Dispersed graphene | Length 1 (Å) | 3.5 ± 3.0 | 4.0 ± 3.0 |
| | Proportion 1 (volume %) | 97.9 | 99.3 |
| Type 2: Agglomerated graphene | Length 2 (Å) | 500 ± 250 | 500 ± 250 |
| | Proportion 2 (volume %) | 2.1 | 0.7 |

The radii of the platelets were deduced from SEM images of the nanographite before charging and solvation in THF, in which the average radii of the platelets is ~50 to 250 nm, as shown in FIG. 6. The sheets are flat in solution due to the balancing of the negative charge on the plates and the solvated potassium cations associated with their surfaces. The intensity of the scattering, the gradients of the slopes, and the Q ranges covered by those slopes all decrease with decreasing concentration because there are fewer scattering centres in solution and so less scattering is seen above the incoherent background.

Figure 4:
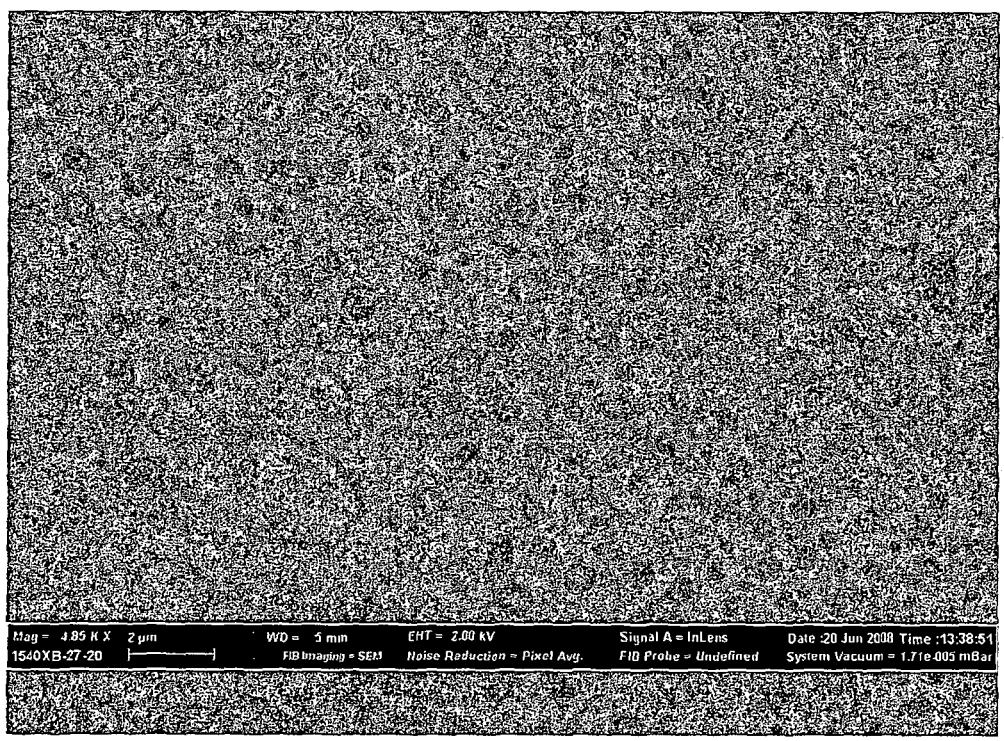
FIG. 4 is an SEM image (at 4.85× magnification) of 0.01 wt % potassium-charged ($KC_{24}$) nanographite in THF, dried onto silicon, showing individual flat species, in contrast to the original nanographite starting material.

In order to confirm the SANS analysis, the solution produced by the method of the present invention was drop-coated onto a mica substrate (for AFM) or a silicon substrate (for SEM). Using contact mode AFM, the resultant images and height profiles corroborated the presence of single graphene sheets in solution (FIG. 6). The individual graphene sheets are clearly seen, confirmed by the height profiles; AFM showed that the graphene layers were ≈1 nm high. In-lens secondary electron imaging in SEM of the dispersed species showed similar discrete flakes of uniform height (FIG. 4). In contrast, the SEM of the graphite starting material showed that it was ≈50-250 nm wide and ≈600 to 2000 nm long prior to contacting with the electronic liquid in the method of the present invention.

The invention claimed is:

1. A solution of graphenes, comprising dissolved graphenes at a concentration of at least 1 mg/ml and a polar aprotic solvent, wherein the graphene is in the form of individual graphene monolayers, and/or wherein monolayer, unscrolled, and unfolded graphenes comprise 80 vol % or more of the graphene species present in solution, as measured by small angle neutron scattering (SANS).

2. A solution according to claim 1, wherein the graphenes are in the form of individual graphene monolayers, individual graphene bi-layers, graphene ribbons, graphene discs, graphene truncated cones, graphene cones, herringbones, or a combination thereof.

3. A solution according to claim 1, wherein the polar aprotic solvent is tetrahydrofuran, dimethyl sulfoxide, dioxane, dimethyl formamide, hexamethylphosphorotriamide, N-methyl pyrrolidone, or acetonitrile.

4. A solution according to claim 1, wherein the graphene species comprise individual mono-dispersed graphenes in the form of individual graphene monolayers, individual graphene bi-layers, or graphene ribbons, or graphene discs, or graphene truncated cones, or graphene cones, or herringbones.

5. The solution of claim 1, wherein the solvent is tetrahydrofuran.

6. The solution of claim 1, wherein the solvent is an amine solvent.

7. The solution of claim 1, wherein the solvent is ammonia.

8. The solution of claim 1, wherein the solvent is methylamine.

9. A solution of dissolved mono-dispersed graphenes, comprising individual mono-dispersed graphenes at a concentration of at least 0.01 mg/ml and a solvent.

10. The solution of claim 9, wherein the solvent is an amine solvent.

11. The solution of claim 9, wherein the solvent is ammonia.

12. The solution of claim 9, wherein the solvent is methylamine.

13. The solution of claim 1, comprising graphenes having a dimension in the a-b plane of 10 µm or less and the solvent comprising a metal.

14. The solution of claim 13, wherein the metal is lithium, sodium, potassium, or a combination thereof.

15. The solution of claim 1, wherein the graphenes are present at a concentration in a range of from about 1 mg/ml to about 10 mg/ml.

16. The solution of claim 9, wherein the solvent is tetrahydrofuran.

* * * * *